United States Patent
Fisher

(10) Patent No.: US 8,996,523 B1
(45) Date of Patent: Mar. 31, 2015

(54) FORMING QUALITY STREET ADDRESSES FROM MULTIPLE PROVIDERS

(75) Inventor: Yechezkia Fisher, New York, NY (US)

(73) Assignee: Google Inc., Mountain View, CA (US)

( * ) Notice: Subject to any disclaimer, the term of this patent is extended or adjusted under 35 U.S.C. 154(b) by 740 days.

(21) Appl. No.: 13/114,850

(22) Filed: May 24, 2011

(51) Int. Cl.
*G06F 7/00* (2006.01)
*G06F 17/30* (2006.01)

(52) U.S. Cl.
CPC .... *G06F 17/30303* (2013.01); *G06F 17/30241* (2013.01); *Y10S 707/919* (2013.01)
USPC ........................ 707/737; 707/776; 707/919

(58) Field of Classification Search
CPC ................. G06F 17/30241; G06F 17/30598; G06F 17/30303; G06F 2216/03
USPC ..................... 707/736, 737, 758, 918, 920
See application file for complete search history.

(56) References Cited

U.S. PATENT DOCUMENTS

| | | | | |
|---|---|---|---|---|
| 6,985,926 B1 * | 1/2006 | Ferlauto et al. | ............... | 709/206 |
| 7,117,199 B2 * | 10/2006 | Frank et al. | ........................ | 707/3 |
| 7,707,192 B1 * | 4/2010 | Lu et al. | ........................ | 707/687 |
| 7,805,518 B1 * | 9/2010 | Kamvar et al. | ............... | 709/227 |
| 8,131,745 B1 * | 3/2012 | Hoffman et al. | ............... | 707/766 |
| 8,533,214 B2 * | 9/2013 | Sharma et al. | ................. | 707/763 |
| 2009/0089070 A1 * | 4/2009 | Engel et al. | ......................... | 705/1 |
| 2010/0023259 A1 * | 1/2010 | Krumm et al. | ................ | 701/208 |
| 2010/0198756 A1 * | 8/2010 | Zhang et al. | .................... | 706/12 |
| 2012/0047179 A1 * | 2/2012 | Faruquie et al. | .............. | 707/797 |
| 2012/0179367 A1 * | 7/2012 | Niu | ............................... | 701/446 |

OTHER PUBLICATIONS

Guo et al, Address Standardization with Latent Semantic Association, Proceedings of the Knowledge Discovery and Data Mining, Jun. 28-Jul. 1, 2009, Paris, France, pp. 1155-1163.*
Murthy et al, Automatically Generating Term-Frequency Induced Taxonomies, Proceddings of the Association for Computational Linguistics (ACL) Conference, Stoudsburg, PA, USA, 2010, pp. 126-131.*

* cited by examiner

*Primary Examiner* — Marc Somers
(74) *Attorney, Agent, or Firm* — Fenwick & West LLP

(57) ABSTRACT

Feature information, such as street address data, is provided by multiple sources of varying levels of trust. The street address data provided by these sources may include various representations of an address for a map feature. Thus, overlapping street address data for the map feature exists. In one embodiment, a feature selection server merges the street address data for the map feature to create a representative street address for the address data provided from multiple sources.

25 Claims, 7 Drawing Sheets

| Feature ID 201 | Map Feature 203 | Reference Address 205 | Street Number 207 | Street Name ID 209 | City Name ID 211 | Province/ State ID 213 | Postal code/ Zip code 215 | Country ID 217 | Lat/Long 219 |
|---|---|---|---|---|---|---|---|---|---|
| 52 | Fenwick & West LLP | 801 California Street, Mountain View, California, 94041, United States of America | 801 | 561 | 630 | 750 | 94041 | 840 | 37.3/-122.0 |
| 53 | Google | 1600 Amphitheatre Parkway, Mountain View, California, 94043, United States of America | 1600 | 521 | 652 | 750 | 94043 | 840 | 37.4/-122.0 |

Fig. 2A

| Street Name ID 209 | Street Name 221 |
|---|---|
| 561 | "California Street" |
| 521 | "Amphitheatre Parkway" |

Fig. 2B

| Country ID 217 | Country 223 |
|---|---|
| 826 | "United Kingdom" |
| 840 | "United States of America" |

FORMING QUALITY STREET ADDRESSES FROM MULTIPLE PROVIDERS

TECHNICAL FIELD

The embodiments disclosed herein generally relate to forming map feature information for a map feature. More particularly, the embodiments herein relate to merging overlapping street address information about a map feature that is received from multiple sources.

BACKGROUND

For products that include user generated content (i.e., community products), the involvement and collaboration of users to add and/or revise user generated content supports the growth and spread of the community products. For example, in an online map product, curators and users of the online maps promote growth of the product by providing street address information regarding map features such as businesses, points of interests, restaurants, etc. Other users, such as business operators of businesses shown on a map, who have a vested interest in the product may also provide street address information relating to the map features. Other users, such as customers of a business, may also provide information about a map feature. The accumulation of feature information from many different users is generally beneficial to the entire user community, but it does entail certain problems and inefficiencies.

SUMMARY

Embodiments disclosed herein generally enable mechanisms to merge feature information from multiple feature providers (e.g., users, employees, online information services, etc.) that describe a map feature. Examples of map features include a point of interest, a building, a store, a restaurant, etc. A feature selection server receives feature information such as street address data from multiple feature providers that are associated with varying levels of trust. The street address data received from the feature providers is considered "raw" street address data because the data included in these addresses as well as the format of the data may vary depending on the provider that supplied the data.

Because multiple feature providers may provide different street address data associated with the same map feature, the feature selection server merges the different street address data into a single representative address. In one embodiment, the representative address for a map feature includes all possible street address data that can be derived from the raw street addresses associated with the map feature.

In one embodiment, the feature selection server standardizes the raw street address data using reference information such as reference addresses that are known to be valid. Generally, a street address is composed of a plurality of address components such as a street name, street number, city, state and country; the components of which can vary from locale to locale. Typically, address components for a given address may be represented in multiple ways. For example, the state of California may be represented as "CA" or "California." Similarly, the country United States of America may be represented as "USA," "US," "United States of America," or "America." Each of the address components of a reference address is associated with a canonical representation that can be used to assign canonical representations to the address components of raw street address data.

The feature selection server standardizes raw street address data by comparing the raw street address data to reference addresses. Canonical representations are assigned to each of the address components of a raw street address based on known, valid standardized street addresses that have address components matching the components from the raw street address. Matching street addresses represent the various ways in which a street address for a single map feature may be represented.

The feature selection server merges the matching street address data into a single representative street address for the map feature. In merging the street address data, the feature selection server can select different components of the street address data from different ones of the matching street addresses from the different feature providers. In one embodiment, the feature selection server may select a value for an address component, such as a geospatial identifier, based on the level of trust afforded to the feature provider that provided the raw street address data associated with the component.

The features and advantages described in this summary and the following detailed description are not intended to be limiting. Many additional features and advantages will be apparent to one of ordinary skill in the art in view of the drawings, specification and claims.

BRIEF DESCRIPTION OF THE DRAWINGS

FIGS. 2A-2C illustrate example tables for storing feature information, according to one embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Overview

Figure 1:
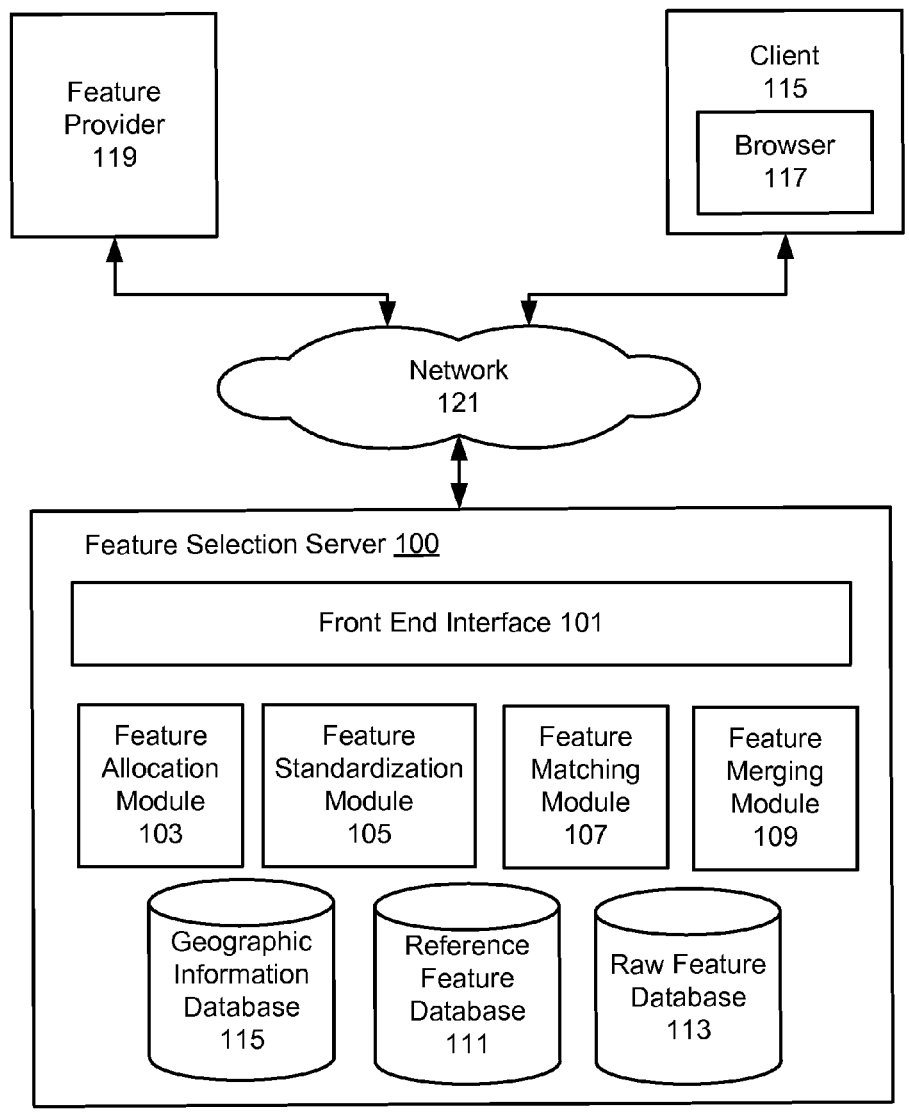
FIG. 1 illustrates a system architecture of a feature selection server in accordance with one embodiment.

FIG. 1 illustrates a system architecture of a feature selection server 100 in accordance with one embodiment. Generally, the feature selection server 100 merges street address data (information) provided by multiple feature providers that are associated with varying levels of quality and trust. The street address data describes locations of map features presented on online (digital) maps hosted by the feature selection server 100. The feature providers contribute information about map features such as street address data in order to expand the information provided in the online maps. In one embodiment, a map feature signifies any entity that may be represented on an online map. For example, map features may include points of interest such as stores, restaurants, buildings, or parks.

Generally, the street address data provided by the feature providers is considered "raw" address data. The street address data received from the feature providers is considered "raw" because the street address data may vary in terms of form and content depending on the provider that supplied the data. Thus, multiple feature providers may provide street address data for the same map feature. Frequently, the raw street address data received from multiple different providers for a given feature lacks consistency in terms of format and content. That is, the different aspects of the raw street address data, such as a complete name of the street, number, city or country name, etc. may differ between the submissions, making it difficult to determine which of the submissions is correct, and erroneous. In one embodiment, the feature selection server 100 identifies a single representation for the raw street address data from the multiple providers for the map feature. By merging the street address data for the map feature, the feature selection server 100 can accept overlapping street address data from multiple feature providers, but keep the address data that best represents each map feature.

As shown in FIG. 1, the feature selection server 100 includes a front end interface 101, a feature allocation module 103, a feature standardization module 105, a feature matching module 107, a feature merging module 109, a geographic information database 115, a reference feature database 111, and a raw feature database 113. In one embodiment, the feature allocation module 103, the feature standardization module 105, the feature matching module 107 and the feature merging module 109 collectively form a feature selection module, although not illustrated in FIG. 1, which can be implemented as a hardware element (or collection of elements) including one or more dedicated logic circuits. Each of these modules and databases is described in further detail below. Many conventional features, such as firewalls, load balancers, application servers, failover servers, site management tools and so forth are not shown so as not to obscure the features of the system.

In one embodiment, a suitable website for implementation of the feature selection server 100 is the GOOGLE™ Map Maker website, found at www.google.com/mapmaker. Other map sites are known as well, and can be adapted to operate according to the teaching disclosed herein. The term "website" represents any computer system adapted to serve content using any networking protocol, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

In one embodiment, the feature selection server 100 is implemented as server program executing on server-class computer comprising a CPU, memory, network interface, peripheral interfaces, and other well known components. In one embodiment, the computers themselves run an operating system such as LINUX, Microsoft Windows, or Mac OS X, have generally high performance CPUs, 2 G or more of memory, and 1 TB or more of disk storage. Of course, other types of computers can be used, and it is expected that as more powerful computers are developed in the future, they can be configured in accordance with the teachings here. The functionality implemented by any of the elements can be provided by computer program products (e.g., as computer executable instructions) that are stored in non-transitory computer-readable storage mediums (e.g., RAM, hard disk, or optical/magnetic media).

In one embodiment, and as shown in FIG. 1, a client 115 executing a browser 117 connects to the feature selection server 100 to allow a user to view online maps that include street address data selected by the feature selection server 100. The client 115 may connect to the feature selection server 100 via a network 121 such as the Internet or any combination of a LAN, a MAN, a WAN, a mobile, wired or wireless network, a private network, or a virtual private network. While only a single client 115 and browser 117 is shown in FIG. 1, in general very large numbers (e.g., millions) of clients are supported and can be in communication with the feature selection server 100 at any time. In one embodiment, the client 115 can be implemented using any of a variety of different computing devices, some examples of which are personal computers, digital assistants, personal digital assistants, cellular phones, mobile phones, smart phones and laptop computers.

The browser 117 may include any application that allows users of clients 115 to access web pages on the World Wide Web. Suitable applications include, but are not limited to GOOGLE CHROME, MICROSOFT INTERNET EXPLORER, NETSCAPE NAVIGATOR, MOZILLA FIREFOX, and APPLE SAFARI. The browser 117 allows the user of client 115 to access websites comprising online maps provided by the feature selection server 100 via a user interface provided by the front end interface 101. Through the interface 101, a user can view online maps provided by the feature selection server 100 that include street address information selected by the feature selection server 100. Additionally, the front end interface 101 allows feature providers 119 to contribute map feature information, such as street address data, for map features presented on the online maps.

A feature provider 119 provides feature information to the feature selection server 100 via network 121. While only one feature provider 119 is shown in FIG. 1, in general, very large numbers of feature providers 119 are supported and can be in communication with the feature selection server 100 at any time. Generally, feature information comprises data that describes a map feature such as a store, restaurant, building, park, landmark, point of interest or any entity that may be represented on a map. In one embodiment, the feature information for a map feature comprises street address data that describes the location of an associated map feature. Note that the feature information may include other information that describes the map feature other than street address data. Feature information received from the feature providers 119 is considered "raw" feature information because the information may be received from multiple providers in varying formats and may include varying content depending on the provider that supplied the information to the server 100.

Generally, each feature provider 119 is associated with a provider type. The provider type describes the nature in which the feature provider 119 provides feature information to the feature selection server 100. In one embodiment, a feature provider 119 maybe classified as a "curator" of map features. A curator is an individual who contributes feature information, such as raw street address data, about existing map features as well as for new map features. Typically, curators are individuals who care about the growth and accuracy of the information included in the online maps rather than individuals such as employees associated with the server 100.

Alternatively, a feature provider 119 is an employee or a group of employees associated with the feature selection server 100 that have a vested interest in the accuracy of the feature information provided by the feature selection server 100. For example, the employee may be part of the Google's Street-smart team that is employed to provide raw feature information about map features to the feature selection server 100.

A feature provider 119 may also be an international standard-setting body, such as the International Organization for Standardization (ISO). The feature selection server 100 may communicate with the international standard-setting body to obtain feature information for map features. For example, the feature selection server 100 may receive from the international standard-setting body country codes for names of countries, dependent territories, and/or special areas of geographical interest. Note that in other embodiments, other categories of feature providers 119 may be employed such as a service type feature provider. A service, such as companies that sell business directory information, mailing lists, and the like may provide address data, either in bulk, or for individual addresses to the feature selection server 100.

In one embodiment, a feature provider 119 can be afforded a level of trust based on provider type. The level of trust describes the quality (accuracy) of the feature information generally provided by a provider 119 of the particular type. The level of trust can be a categorical value (e.g., "Highly Trusted", "Moderately Trusted," "Low Trusted"; or "A," "B," "C") or an integer value (e.g., 1, 2, 3, ..., 5). Generally, provider types are ranked in descending order from curator, employee, and international standard-setting body. However, alternative rankings can be employed in other embodiments.

Feature Selection Server

As shown in FIG. 1, the feature selection server 100 comprises a geographic information database 115. The geographic information database 115 stores geographic information that is displayed on digital or online maps, and is one means for performing this function. Generally, a map is organized in map portions, such as S2 cells, that have various zoom levels and are identified by the latitude and longitude of two of the diagonally opposite corners. At the lowest zoom level, level 1, the Earth is divided into a number of portions. In one embodiment, there are six square portions at level 1. At each subsequent zoom level, each portion from the previous level is further divided into sub-portions. For example, a map portion at zoom level 1 maybe further divided into 4 sub-portions. Thus at level 2, the Earth is divided into 24 portions. At the highest zoom level, the Earth may be divided into portions that define a geographic region that is 1 centimeter (cm) by 1 cm in size.

The record for a map portion further includes the map features that are associated with that map portion. The map features associated with a map portion are located in the geographical region corresponding to the map portion. Generally, a map feature represents a stationary real world object that can be represented on an online map. A map feature may also represent conceptual objects such as borders which are not physical real world objects, or historical events that took place at a given location (e.g., a battle, speech, assassination, etc.)

In one embodiment, map features are classified as either point features, polygon features, or line features. A point feature describes a point of interest that may be represented as a single point (e.g., a geospatial identifier such as latitude and longitude coordinates) on the online map such as an establishment (e.g., restaurant or book store) or a landmark according to one embodiment. Feature information for a point feature comprise at least the street address data associated with the point feature and a geo-code (e.g., latitude and longitude coordinates) describing the location of the point feature. The feature information may also include a name or other identifier associated with the point feature (e.g., "Empire State Building") as well as other attributes such as hours of operation or accepted forms of payment for a restaurant point feature.

In one embodiment, a polygon feature describes a boundary of a map feature. Generally, a polygon feature represents any feature on a map that may be enclosed by a defined boundary such as a building, park, or water body, etc. Point features may also be associated with a geometry feature. The geometry feature may indicate a boundary of the point feature. For example, the point feature "Empire State Building" may be associated with a geometry feature indicating the area that represents the boundary of the building.

In one embodiment, a boundary of a polygon feature is represented as a series of points that form a closed polygon. Each point of a boundary corresponds to a geospatial identifier such as a latitude and longitude coordinate. The feature information of a geometry feature comprises the street address data associated with the polygon feature such as the address of a park. Additionally, the feature information may include a list of points that collectively represent the boundary of the polygon feature, a name or other identifier of the geometry feature (e.g., Central Park), and optionally an associated point feature.

Line features describe linear map features such as roads, highways, intersections, railways, and subways. In one embodiment, a line feature is represented by a plurality of points, each point corresponding to a latitude and longitude coordinate. However, unlike geometry features, the points of a line feature do not form a closed polygon. Though, exceptions to this rule may exist such as the Washington Beltway which is a freeway that forms a closed loop around Washington D.C. The points of a line feature describe the starting location and ending location of the feature as well as any intermediate locations between the starting and ending locations. These intermediate locations may represent any prominent curve or vertex in the line feature between the starting and ending locations. The feature information of a line feature includes street address data such as the geographic region in which the line feature is located such as zip code, city and/or state in which the line feature is located. The feature information may also include a name associated with the line feature as well as the list of points that represent the line feature.

The reference information database 111 stores reference feature information for the map features described in the geographic information database 115. The reference feature information describes street address data associated with map features and may include other attributes. The reference street address data included in the reference database 111 is considered accurate (valid) and has been formatted by the feature selection server 100 for display to users on clients 115.

Generally, a street address is composed of a plurality of address components such as a street number, street name, city, province/state, zip code and country. Other address components may include alternative information such as neighborhood information since street addresses in different countries, states, provinces, or other types of locales may have different components than those described herein. Each component of the reference street address data in the reference database 111 is mapped to a canonical representation which is represented by a unique identifier (ID), as will be further described in detail below.

In one embodiment, each map feature record in the reference feature database 111 is assigned an identifier, such as a feature ID, that represents the map feature for that record. The map feature record comprises one or more of the following street address components that collective represent the reference street address data for the map feature:

Street number component: describes the street number of the street in which the map feature is located;

Street component: describes the name of the street in which the map feature is located;

City component: describes the city in which the map feature is located;

Province/State component: describes the province/state in which the map feature is located;

Postal code/zip code component: describes the postal code/zip code in which the map feature is located;

Country component: describes the country in which the map feature is located; and Geocode component: describes a geospatial identifier (e.g., latitude and longitude coordinates) associated with the map feature.

As previously mentioned above, each map feature record is associated with a feature ID. FIG. 2A illustrates an example table depicting example records of map features and their associated feature IDs. Although only two records are shown in FIG. 2A, it is understood that that the reference feature database 111 may comprise any number of records.

As shown in FIG. 2A, each record (row) in feature database 111 comprises a number of fields, including an associated feature ID 201 (which can serve as a primary key), the map feature 203 associated with the feature ID 201, the address 205 for the map feature 203, and the street address components (207, 209, 211, 213, 215, 217, 219) of the address 205. In one embodiment, the street address components include the street number 207, the street name ID 209, the city name ID 211, the province/state ID 213, the postal code/zip code 215, country ID 217, and latitude and longitude coordinates 219.

As previously mentioned, the reference address data for a map feature is composed of a plurality of street address components. However, for components that have textual value, instead of being stored directly in the database record as text strings, at least some of these components are stored using IDs. The IDs reference to another set of tables which store the string values associated with those IDs. More specifically, an address component stores an ID that is linked to the canonical representation (e.g., textual value in a standardized format) for the component. However, note that the street number, postal code/zip code, and latitude/longitude coordinates do not map to a unique ID, since these values are already numerical. Rather, these components are associated with the actual numerical values for the associated components of the reference address data.

FIG. 2B illustrates a table that maps street name IDs 209 to their corresponding textual string values or street names 221. For example, according to FIG. 2B the street name ID "561" corresponds to the canonical representation of the street name "California Street" and the street name ID "521" corresponds to the canonical representation of the street name "Amphitheatre Parkway." FIG. 2C illustrates a table that maps country IDs 217 to their corresponding country names 223. For example, the country ID "840" corresponds to the canonical representation of the country "United States of America" whereas the country ID "826" corresponds to the canonical representation of the country "United Kingdom." Similar tables map city name IDs and province/state IDs to their corresponding canonical representations. These tables are used to store the canonical representations (i.e., the textual values) of these address components. Similar tables can be constructed for other address components. Alternatively, a single table of canonical address components can be used, with each component have a unique ID that can be used in the feature database table.

As an example, record ID "52" is associated with the map feature "Fenwick & West LLP" whose address is "801 California Street, Mountain View, California, 94041, United States of America." As shown in FIG. 2A, the street name ID 209, city name ID 211, province/state ID 213, and country ID 217 each map to a canonical representation that is associated with a street address component of the map feature. Specifically, in the first row, in the example shown in FIG. 2A, feature ID "52" is associated with street name ID "561," and country ID "840" which respectively correspond to the canonical representation "California Street," in the table in FIG. 2B, and the canonical representation "United States of America" in the table in FIG. 2C. Similarly, feature ID "53" is associated with street name ID "521," and country ID "840" which respectively correspond to the canonical representation "Amphitheatre Parkway," in the table in FIG. 2B, and the canonical representation "United States of America" in the table in FIG. 2C.

In contrast, the street number, zip code, and latitude/longitude coordinates associated with feature ID "52" correspond to the actual numerical values in the street address for each component. For example, the street number for feature ID "52" corresponds to "801," the zip code corresponds to "94041" and the latitude/longitude coordinates of the map feature are "37.3 and 112.0."

Referring back to FIG. 1, the raw feature database 113 stores raw feature information provided by feature providers 119, and is one means for performing this function. Unlike the reference feature information stored in the reference feature database 111, the raw feature information lack a canonical representation for the components that make up the information. Generally, the information is in various formats because the raw feature information is provided by different feature providers 119. Each feature provider 119 may provide feature information in particular forms.

For example, for a given location the feature selection server 100 may receive feature information from two different feature providers 119. A first feature provider may provide the address "1600 Amphitheatre Pkwy, Mt. View, CA, 94043, USA" whereas a second provider may provide the address "1600 Amphitheatre Parkway, Mountain View, CA, 94043." The address information from the two feature providers 119 correspond to the same map feature, but include different data and are presented in varying formats. That is, the first provider represents the street name as "Amphitheatre Pkwy" and the city associated with the map feature as "Mt. View" whereas the second provider 119 represents the street name as "Amphitheatre Parkway" and the city as "Mountain View." Also, the first feature provider 119 includes the country "USA" in the address whereas the second feature provider 119 omits the country in which the address is located.

The feature allocation module 103 allocates raw feature information from the raw feature database 113 to map portions defined by the geographic information database 115, and is one means for performing this function. Generally, the feature allocation module 103 assigns up to a maximum of n-features (e.g., 20,000 features) to a map portion. In one embodiment, the feature allocation module 103 utilizes a bucketing mapreduce to group addresses that are physically located near each other in terms of distance and assigns the grouped addresses to a corresponding map portion whose associated geographical region comprises the addresses in real life. Generally, the mapreduce is a framework that processes large datasets (e.g., raw feature information) using a large number of computers (nodes). A master node (e.g., the feature selection server 100) partitions the raw feature information and distributes the information to its worker nodes to create a multi-level tree structure. Each worker node allocates its raw feature information to corresponding map portions.

The feature selection server 100 receives indications of which map portions the feature information was allocated to by the worker nodes. The feature allocation module 103 may further refine the allocation of the raw feature information to more discrete map portions based on the street number and street name for each address included in the information. Note that in other embodiments, other methodologies may be used to allocate the raw feature information to corresponding map portions.

Figure 3A:
FIG. 3A-3C illustrate examples of map portions for clustering map feature information, according to one embodiment.

Referring now to FIG. 3A, an example of a map portion 300 is shown. Map portion 300 includes a plurality of map features that correspond to the raw street address data allocated to the map portion 300. Each map feature is illustrated in FIG. 3A by an indication such as marker 301. Each marker illustrates the location of its associated map feature in the map portion 300.

Figure 3B:
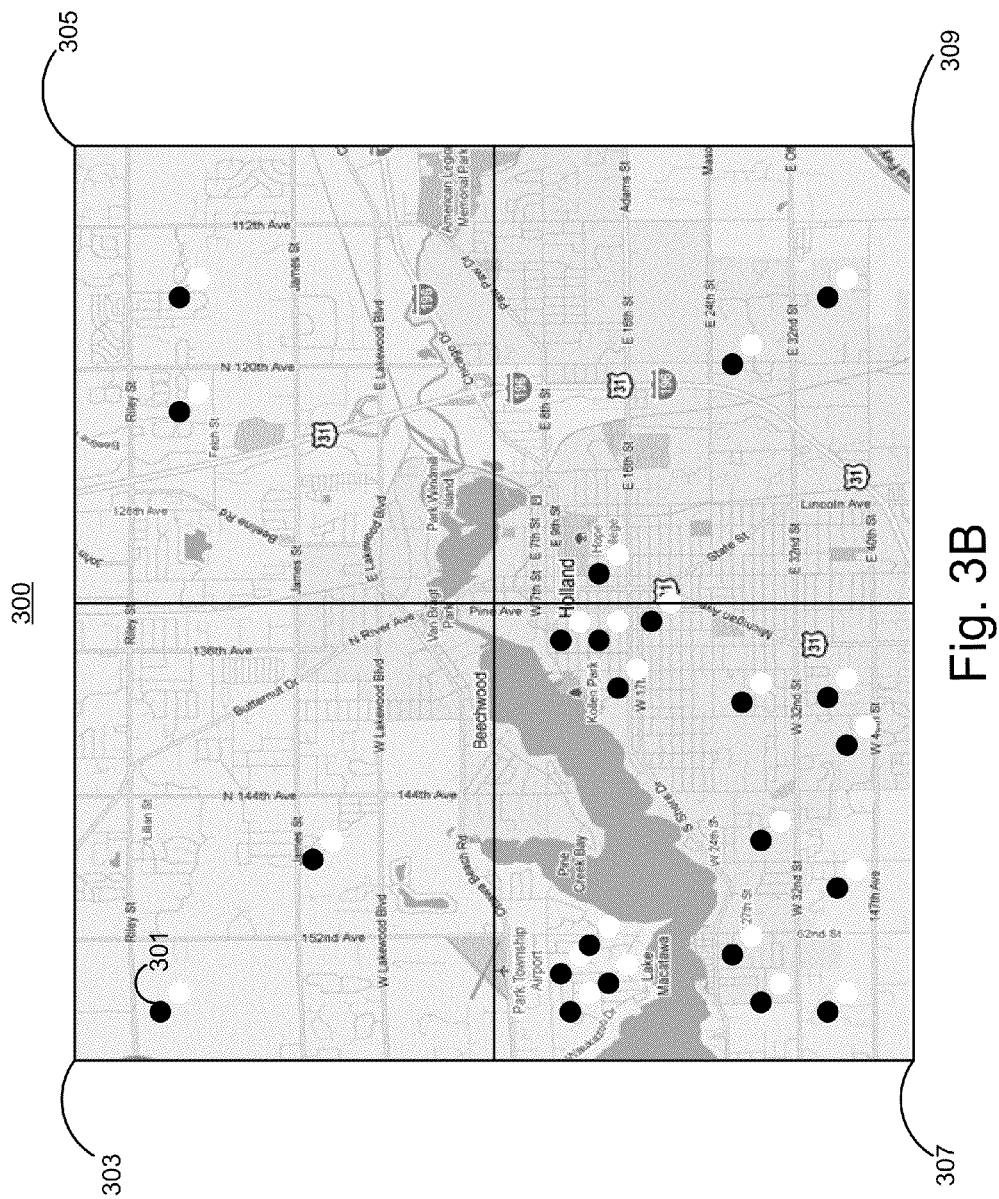

FIG. 3B illustrates the next zoom level for the map portion 300. The map portion at the next zoom level comprises a plurality of sub-portions. In this example, map portion 300 includes sub-portion 303, sub-portion 305, sub-portion 307, and sub-portion 309. By further dividing the map portion 300 into several sub-portions, the raw street address data is localized to more specific areas of the map portion 300.

Figure 3C:
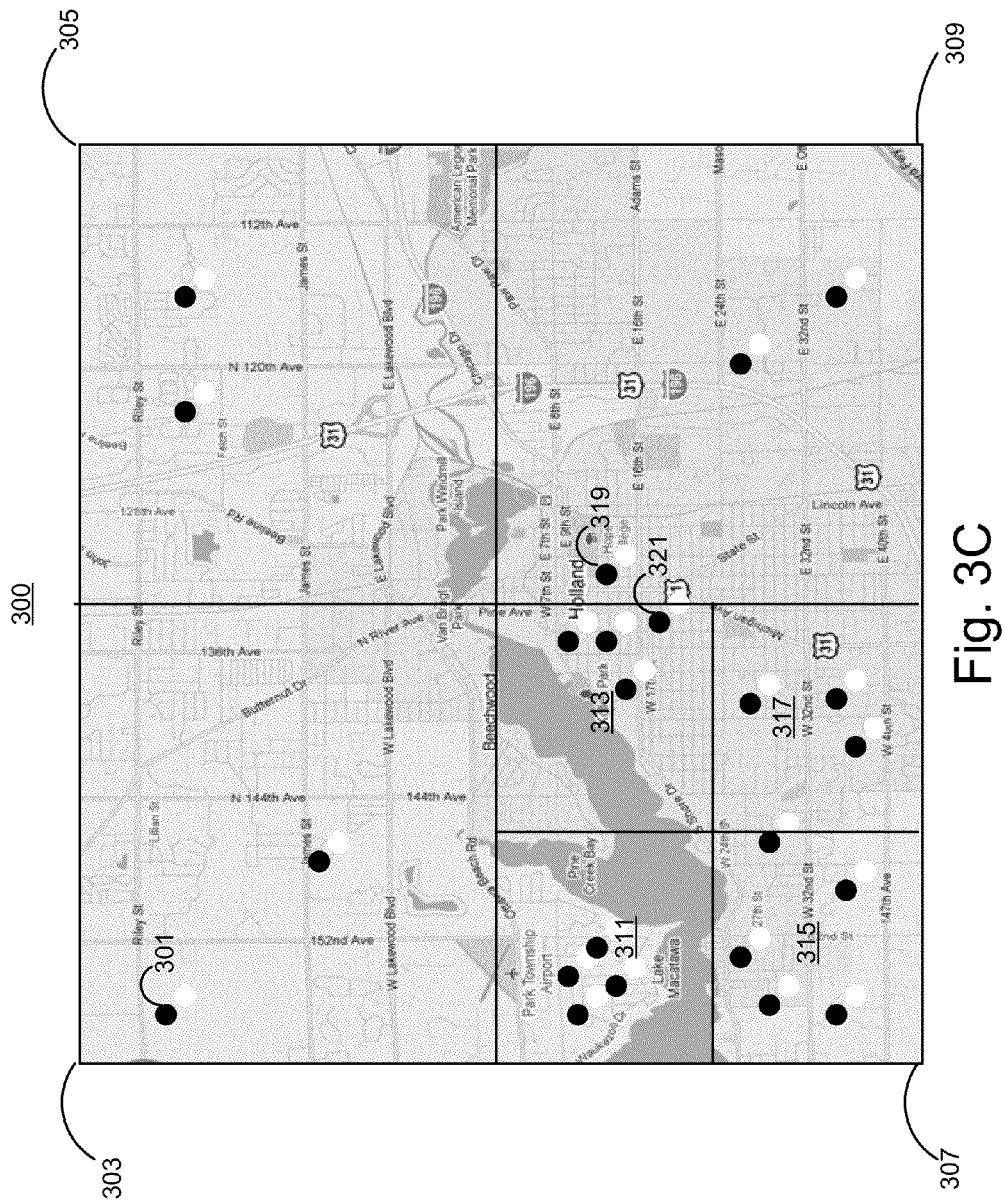

A sub-portion may be further divided into its own sub-portions as shown in FIG. 3C. In FIG. 3C, sub-portion 307 is divided into portion 311, portion 313, portion 315, and portion 317. Because sub-portion 307 is allocated with more raw street address data compared to sub-portions 303, 305, and 309, further dividing sub-portion 307 into smaller portions allows the feature allocation module 103 to finely group raw street address data to more localized areas of the map portion 300.

In one embodiment, the feature allocation module 103 allocates map features assigned to a map portion to its neighboring map portions, and is one means for performing this function. If a map feature assigned to a map portion is located a threshold distance (e.g., 1 kilometer (km)) from a neighboring map portion, the feature allocation module 103 also assigns the map feature to the neighboring map portion. Thus, the raw street address data for the map feature is associated with the neighboring map portion as well as the map portion that the feature was originally allocated to by the feature allocation module 103.

For example, map feature 319 is assigned to map portion 309. However, map feature 319 is within 1 km (i.e., the threshold distance) from the border of map portion 313. Accordingly, the feature allocation module 103 also assigns map feature 319 to map portion 313. Similarly, map feature 321 is assigned to map portion 313, but is within 1 km from map portion 309. Accordingly, the feature allocation module 103 assigns map feature 321 to map portion 309.

Referring back to FIG. 1, the feature standardization module 105 standardizes the raw street address data allocated to each map portion, and is one means for performing this function. In one embodiment, the feature standardization module 105 standardizes the raw street address data for a map portion using the reference feature information stored in the reference feature database 111. The feature standardization module 105 identifies the reference feature information associated with the map portion and compares the raw street address data allocated to the same map portion to the reference feature information. Specifically, for each map portion, the feature standardization module 105 assigns canonical representations from the reference feature database 111 to the address components of the raw address data allocated to the map portion by storing the ID that references the canonical representation.

For a raw street address, the feature standardization module 105 decomposes the raw street address into its address components. Specifically, the feature standardization module 105 identifies the textual string values associated with the street component, city component, province/state component, and country component of the raw street address. The string values and formats associated with these components typically vary from each feature provider 199 and thus require standardization. Additionally, the feature standardization module 105 identifies if the raw street address data is missing (i.e., lacks) values for the above components.

For example consider the raw street address "801 California St., Mt. View, CA." The feature standardization module 105 identifies the following string values for the raw street address:

Street component: "California St."
City component: "Mt. View"
Province/State component: "CA"
Country component: N/A For each component of the raw street address, the feature standardization module 105 identifies the reference feature information from the reference feature database 111 that best matches the string values of the component. Specifically, for each component of the raw street address, the feature standardization module 105 identifies a canonical representation that most closely matches the string value for the component of the raw street address. To identify a canonical representation, the feature standardization module 105 may apply name expansion techniques to the string value of a raw address component prior to identifying a corresponding reference feature with a matching string value. String matching can be based as well on edit distances (e.g., Hamming, Levenshtein, or the like), long common subsequences, fuzzy matching, or any other appropriate method.

For example, the feature standardization module 105 may first expand the street component "California St." to "California Street," using a list of standard expansions (e.g. the abbreviation "St." expands to the string "Street"), and then match the expanded string to the matching reference feature information in the reference feature database 111. Accordingly, the feature standardization module 105 assigns the canonical representation of "California Street" to the address component, by assigning its feature ID "561," to the street component of the raw address data. The ID "561" corresponds to the canonical representation of the reference street name "California Street" as shown in FIG. 2B. The feature standardization module 105 may employ similar techniques to identify and assign the canonical representations for the city component "Mt. View" and the province/state component "CA" which may respectively be the string "Mountain View" and string "California."

In this example, the feature standardization module 105 also identifies that the raw street address data lacks a country component. Because the province/state component has been identified as "California," the feature standardization module 105 identifies that the country in which "California" is located is the United States of America. Accordingly, the feature standardization module 105 associates the country component with the canonical representation "United States of America." In this example, the unique ID "840" which represents the canonical representation "United States of America" is assigned to the country component as shown in FIG. 2C.

If the feature standardization module 105 cannot identify a canonical representation for a component of the raw street address data, the feature standardization module 105 creates the canonical representation. The feature standardization module 105 assumes that the string value for the component is the first instance of that particular value. For example, if a canonical representation for the street name "Zanker Road" does not exist in the reference feature database 111, this is an indication that "Zanker Road" is a new street name. Thus, the feature standardization module 105 may use "Zanker Road" as the canonical representation and then creates a unique ID that corresponds to the canonical representation.

Referring back to FIG. 1, the feature matching module 107 identifies matching standardized street addresses allocated to each map portion, and is one means for performing this function. Whereas the prior matching was done at the level of individual address components, the feature matching module 107 matches at the level of the entire street addresses. Generally, these matching standardized addresses describe the street address of the same map feature. As previously mentioned, a plurality of feature providers 119 may prove raw street address data about the same map feature which results in overlapping data.

To determine the matching street addresses allocated to a map portion, the feature matching module 107 compares the feature IDs of the canonical representations of the standardized street addresses to identify matching addresses. In one embodiment, a pair of standardized addresses is considered to match if each address component in the pair shares the same canonical representation, e.g., they have matching IDs. For example, the street number, street name, city, province/state, and country for the pair of addresses have the same canonical representation to be considered a match.

Alternatively, only a subset of the components in the pair of addresses may share the same canonical representation to be considered a match. For example, a pair of addresses may share the same canonical representations for the street number, street, name, city, and province/state components, but the second address in the pair may include additional information such as a country component. The first address in the pair is considered to be a subset match of the second address. In one embodiment, a subset match describes when a portion of the components of a standardized address match another standardized address.

Figure 4:
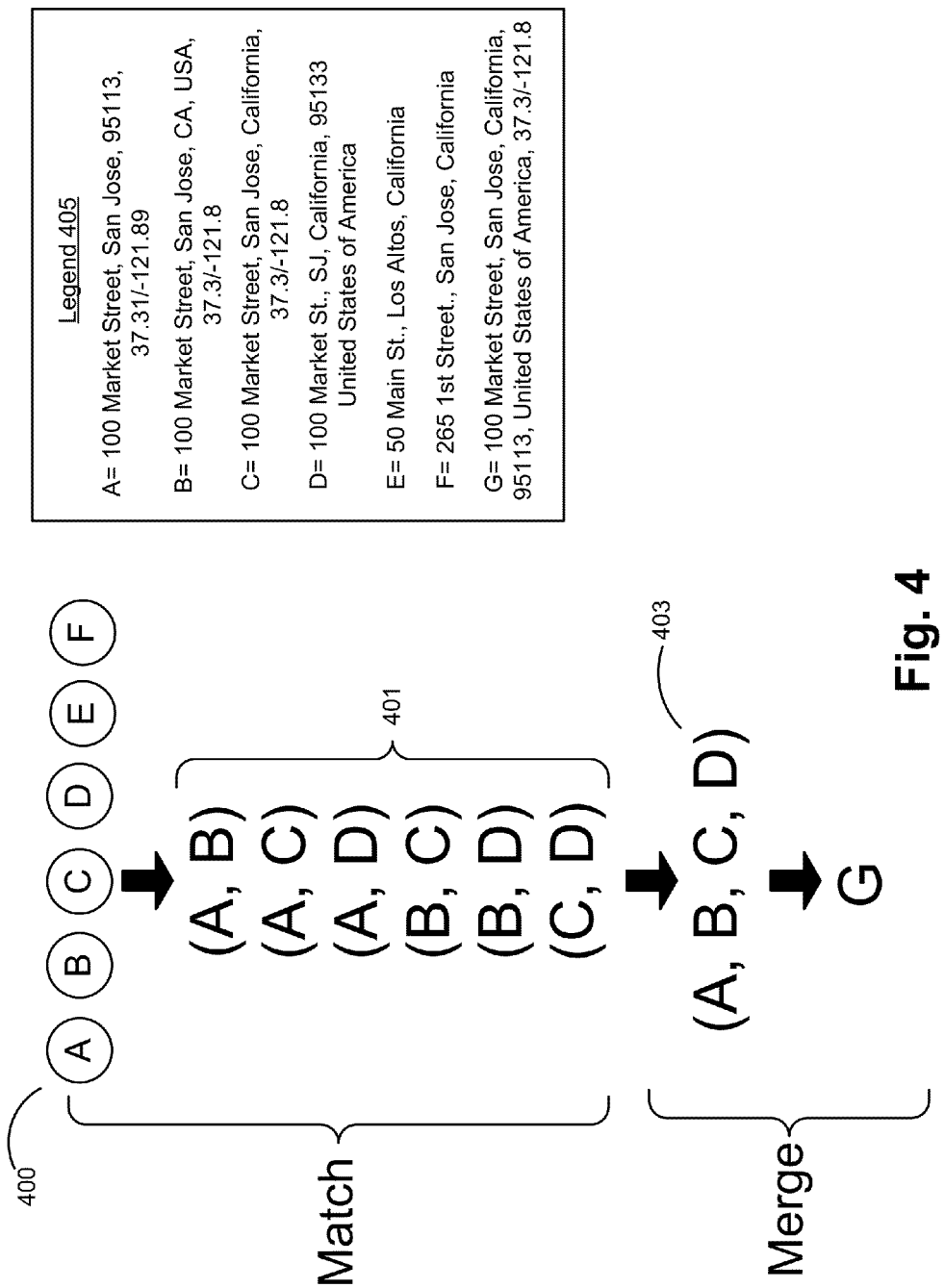
FIG. 4 illustrates a graphical representation of how to merge feature information for a single map feature, according to one embodiment.

Referring now to FIG. 4, a graphical example is shown of how the feature matching module 107 matches standardized street addresses. In FIG. 4, addresses 400 represent the standardized street addresses allocated to a map portion. Addresses 400 comprise address A, address B, address C, address D, address E, and address F. Legend 405 illustrates the street address data for each address.

The feature matching module 107 compares the canonical representations of each standardized street address with the canonical representations of the other standardized street addresses assigned to the map portion to determine matches. Pairs of standardized street addresses that include the same canonical representations for all or a sub-set of the components of the street address are considered matches.

In FIG. 4, the match set 401 indicates the pairs of matches identified by the feature matching module 107. Here, the feature matching module 107 determined that address A and address B include matching features, address A and address C include matching features, and address A and address D include matching features. Likewise, the feature matching module 107 determined that address B and address C have matching features and address B and address D have matching features. Lastly, the feature matching module 107 determined that address C and address D have matching features. As shown in FIG. 4, address E and F do not match any of the addresses in set 401.

Referring back to FIG. 1, the feature merging module 109 merges matching street addresses to create a representative address, and is one means for performing this function. The representative address includes the address data from the matching addresses to create the most comprehensive address possible. The representative street address is stored in the reference feature database 111 as a reference feature according to one embodiment and is associated with the corresponding map feature. Thus, the representative street address is provided when information for the map feature associated with the address is requested by a client 115.

To create the representative address, the feature merging module 109 groups pairs of matching street addresses to form a merge list of matching street addresses. Each of the street addresses in the merge list is either a full match or sub-set match of the other addresses in the merge list. The feature merging module 109 creates the representative address of the addresses in the list by merging the street address components from the addresses in the list to form a representative address that includes string values for all the possible address components.

For example, a first street address in the list comprises string values for a street number component, street component, and city component. Thus, the first street address lacks string values for the zip code component, province/state component and country component. A second street address in the list comprises a street number component, street component, city component, zip code component, and state component. The feature merging module 109 may create the representative address such that it has the most complete street address possible using the string values for the addresses in the merge list. From the first street address and second street address, the feature merging module 109 creates a representation that comprises string values for the street number component, street component, city component, zip code component, state component, and country component. Although neither the first street address nor the second street address included the country component, the feature merging module 109 may derive the country component from the other street address information included in the representation such as the string value for the province/state component.

In one embodiment, the feature merging module 109 selects the geospatial identifier (e.g., latitude and longitude coordinates) for the map feature based on provider type. The feature merging module 109 analyzes the provider type associated with each feature provider 119 that provided the street address data in the merge list from which the representative address was created. The feature merging module 109 selects the geospatial position provided by the most trusted provider in the list. In one embodiment, a curator type feature provider 119 is considered the most trusted provider followed by an employee type feature provider 119. Accordingly, the geospatial identifier provided by a curator in the list of address information is assigned to the representative street address. In one embodiment, if multiple providers of the most trusted type are associated with the list of matched features, the feature merging module 109 makes an arbitrary, but deterministic selection of which geospatial identifier to associate with the representative street address. That is, if multiple feature providers 119 of the most trusted type provided geospatial identifiers for a map feature, the feature merging module 109 selects the first, the last, or random geospatial identifier from those supplied by the feature providers 119 of the most trusted type.

Referring to FIG. 4, a graphical illustration of how to merge matching street address information to create a representative street address is shown. As shown in FIG. 4, the feature merging module 109 creates a merge list 403 of the street addresses included in the set 401 of matching pairs of addresses. The merge list 403 represents the street addresses which are considered to have matching components. The feature merging module 109 creates the representative address "G" which is a representation of the street addresses included in the merge list 403.

As previously mentioned, the feature merging module 109 creates the representation "G" by merging the street address components from the addresses in the merge list 403 to create the representative street address. The following table below indicates the address components included in the street addresses from the merge list 403. In the table below an indication "X" signifies that the street address comprises a string value for a particular address component (e.g., a street number, street, city, etc.) and an indication "–" signifies that the street address lacks a string value for street address component.

| Street Address | Street Number | Street | City | Province/State | Zip Code | Country | Geospatial Identifier |
|---|---|---|---|---|---|---|---|
| A | X | X | X | – | X | – | X |
| B | X | X | X | X | – | X | X |
| C | X | X | X | X | – | – | X |
| D | X | X | X | – | X | X | – |

In this example, the feature merging module 109 creates the representation such that it has string values for each address component identified above. Thus, the representation "G" includes string values for the street number component, street name component, city component, province/state component, zip code component, and country component using the values of the components from the addresses in the merge list 403. The feature merging module 109 obtains the string value components for the representation from each of the street addresses in the list. As previously described, each component of the street addresses in the list is mapped to a canonical representation since the values were previously standardized.

In one embodiment, the feature merging module 109 selects the geospatial identifier associated with the representative address based on the provider type. As previously described, levels of trust are assigned to different types of feature providers 119. In one embodiment, curators are assigned the highest level of trust. Accordingly, in this example the geospatial identifier provided by a curator is selected as the identifier assigned to the representation.

In this example, assume address A was provided by a curator, address B was provided by an employee, and address C was provided by an employee. Thus, the geospatial identifier provided by address A would be assigned to the representation, as it comes from a provider with the highest level of trust. In another example, assume address A and address B were both provided by curators and address C was provided by an employee. Here, the feature merging module 109 randomly selects the geospatial identifier provided by one of the curators.

Once the representative street address is created, the feature merging module 109 saves the street address. Accordingly, when a user of client 115 requests for the map feature associated with the address, the representative address is provided with other information about the map feature.

Process for Merging Street Addresses

Figure 5:
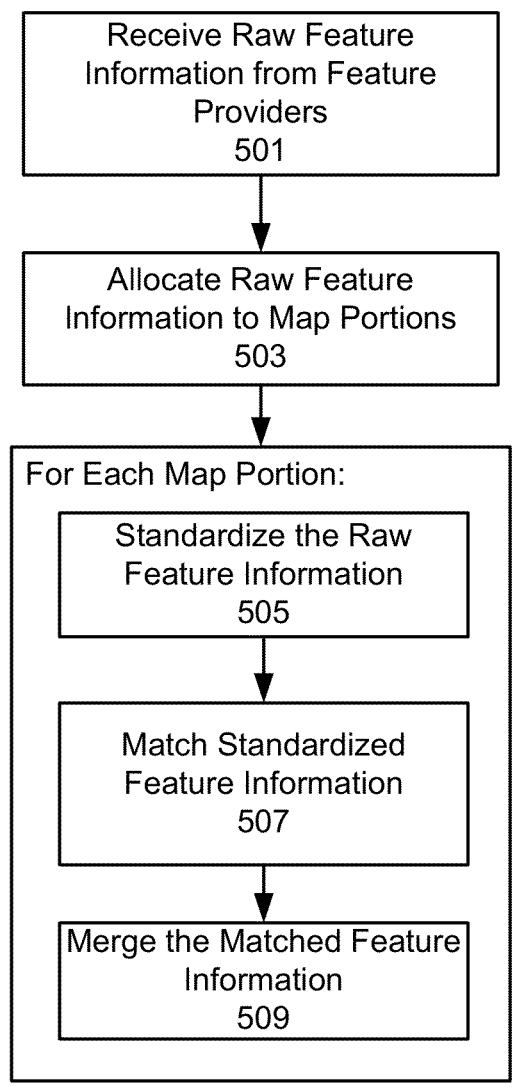
FIG. 5 illustrates a method for merging map feature information for a map feature, according to one embodiment.

Referring now to FIG. 5, there is shown one embodiment of a method performed by the feature selection server 100 for merging street addresses from multiple feature providers 119.

Note that in alternative embodiments, other steps may be performed other than those shown in FIG. 5.

In one embodiment, the feature selection server 100 receives 501 raw feature information from a plurality of feature providers 119. The raw feature information includes street address data from the feature providers 119. The street address data provided by the feature providers 119 describe location information about map features such as buildings, restaurants, parks, etc. The feature selection server 100 allocates 503 the raw feature information to map portions that describe geographic regions of the Earth. The allocation of the raw feature information to a map portion indicates that the map features associated with the information are located in the geographic region associated with the map portion.

For each map portion, the feature selection server 100 standardizes 505 the raw feature information based on reference feature information stored in the reference feature database 111. The reference feature information describes reference street addresses that are each represented by one or more canonical forms. That is, each street address component of a reference street address is associated with a canonical representation that corresponds to unique identifier. For example, the canonical representation "United States of America" representing a country component corresponds to the country ID "840." In one embodiment, standardizing a raw street address comprises identifying canonical representations in the reference feature database 111 for the street address components of the raw street address.

The feature selection server 100 matches 507 standardized feature information allocated to the map portion. That is, the feature selection server 100 identifies pairs of raw street addresses that comprise the same information. Specifically, the feature selection server 100 identifies pairs of raw street addresses that have the same canonical representation for the components of the standardized street address. Having the same canonical representation for the components of the street address indicates that the pair of raw street addresses includes matching data. Additionally, the feature selection server 100 identifies pairs of raw street addresses that have a matching subset of canonical representations for the components of the street address.

The feature selection server 100 merges 509 the matched feature information. That is, the feature selection server 100 groups pairs of matching street addresses into a merge list. The merge list represents the street addresses allocated to the map portion that describe the same map feature. Only a single instance of each street address is included in the merge list. The feature selection server 100 then combines the raw street addresses in the merge list to create a representative address for the merge list. In one embodiment, the representative address includes all possible street address data that can be derived from the raw street addresses in the list. For example, the representative address includes the street number, street name, city, province/state, zip code, and country for the map feature associated with the representation.

Additionally, the feature selection server 100 assigns a geospatial identifier to the representation. In one embodiment, the feature selection server 100 assigns the geospatial identifier based on provider type. Each street address data in the merge list is associated with a feature provider of a particular type that provided in the data to the feature selection server 100. As previously mentioned, each provider type is assigned a level of trust where curators are considered the most trustworthy followed by employees and then followed by standard-setting bodies. Accordingly, the feature selection server 100 selects a geospatial identifier provided by a curator for association with the representation.

The feature selection server 100 performs the above steps for each map portion to identify representative addresses for overlapping address data provided by the feature providers 119. Thus, when users of clients 115 request for map features (e.g., buildings or stores), the feature selection sever 100 provides the representative street addresses corresponding to the map features which were determined using the process described above. Note that in alternative embodiments, the functionality of the feature selection server 100 discussed herein may be included in entities other than the feature selection server in order to create representative street addresses of map features. For example, the functionality may be included in the client 115 or may be distributed across other servers.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

I claim:

1. A computer-implemented method comprising:
   determining a set of components of street address data that collectively represent a complete street address, each component of street address data associated with a type of street address data;
   accessing a plurality of street addresses for a map feature, each of the street addresses comprising values for a plurality of components of street address data from the set and the plurality of street addresses provided by a plurality of providers, each provider assigned a level of trust based on a provider type that is selected for the provider from a plurality of defined provider types, wherein the plurality of street addresses are stored in a non-transitory computer-readable storage medium;
   standardizing the plurality of street addresses so that each value for a component of street address data is represented using a canonical representation;
   using the canonical representations to identify a group of standardized street addresses for the map feature, wherein each standardized street address in the group has at least one value for a component matching a value for a corresponding component of a same type of another standardized street address in the group; and
   for each component from the set having one or more associated values in the group of standardized street addresses, selecting a value for the component from the one or more values based on levels of trust of the plurality of providers that provided the values in the group, the selected value provided from a provider with a highest trust level from the levels of trust of the plurality of providers;

wherein the selected values for the components of the set represent a most comprehensive street address for the map feature.

2. The computer-implemented method of claim 1, wherein the components of street address data comprise at least one of a street number component, a street component, a city component, a state component, a zip code component, and a country component.

3. The computer-implemented method of claim 1, further comprising:
    allocating the street addresses to one or more geographical regions in which the street addresses are located.

4. The computer-implemented method of claim 3, wherein standardizing the plurality of street addresses comprises:
    identifying reference street addresses associated with a geographical region in which the street addresses are located, each reference street address comprising values for components of street address data, wherein each value for a component of street address data is associated with the canonical representation; and
    assigning canonical representations to values of components of street address data for the street addresses based on the values of the reference street addresses.

5. The computer-implemented method of claim 1, wherein using the canonical representations to identify the group of standardized street addresses comprises:
    comparing pairs of standardized street addresses to identify matching pairs of standardized street addresses, each matching pair having the same canonical representation for at least one of the components of the street address data; and
    identifying the group of standardized street addresses as containing the matching pairs.

6. The computer-implemented method of claim 1, wherein selecting the value comprises:
    selecting a geospatial identifier for the representative street address from geospatial identifiers received from providers associated with the street address in the group based on provider type.

7. The computer-implemented method of claim 6, wherein responsive to the geospatial identifiers being received from a plurality of providers all associated with a most trusted provider type, selecting either a first geospatial identifier from the geospatial identifiers received from the plurality of providers, a last geospatial identifier from the geospatial identifiers received from the plurality of providers, or a random geospatial identifier from the geospatial identifiers received from the plurality of providers.

8. The computer-implemented method of claim 1, wherein selecting the value comprises:
    including in the most comprehensive street address a first value for a first street address component from a first street address in the group; and
    including in the most comprehensive street address a second value for a second street address component from a second street address in the group.

9. The computer-implemented method of claim 1, wherein the levels of trust are categorical values, each categorical value describing a level of accuracy of street addresses provided by a provider assigned the categorical value.

10. The computer-implemented method of claim 1, wherein each provider is associated with one of the following provider types comprising an employee of a company that provides the map feature with the selected values, an individual contributor that is not an employee of the company, or a standard-setting body that standardizes address information.

11. The computer-implemented method of claim 10, wherein a provider is assigned a level of trust responsive to whether the provider is an employee of the company, an individual contributor, or a standard-setting body, wherein the individual contributor is assigned the highest level of trust.

12. A computer program product comprising a non-transitory computer-readable storage medium containing executable computer program code, the code when executed by a computer processor cause the processor to:
    determine a set of components of street address data that collectively represent a complete street address, each component of street address data associated with a type of street address data;
    access a plurality of street addresses for a map feature, each of the street addresses comprising values for a plurality of components of street address data from the set and the plurality of street addresses provided by a plurality of providers, each provider assigned a level of trust based on a provider type that is selected for the provider from a plurality of defined provider types;
    standardize the plurality of street addresses so that each value for a component of street address data is represented using a canonical representation;
    use the canonical representations to identify a group of standardized street addresses for the map feature, wherein each standardized street address in the group has at least one value for a component matching a value for a corresponding component of a same type of another standardized street address in the group; and
    for each component from the set having one or more associated values in the group of standardized street addresses, selecting a value for the component from the one or more values based on levels of trust of the plurality of providers that provided the values in the group, the selected value provided from a provider with a highest trust level from the levels of trust of the plurality of providers;
    wherein the selected values for the components of the set represent a most comprehensive street address for the map feature.

13. The computer program product of claim 12, wherein the components of street address data comprise at least one of a street number component, a street component, a city component, a state component, a zip code component, and a country component.

14. The computer program product of claim 12, wherein the code when executed cause the processor to:
    allocate the street addresses to one or more geographical regions in which the street addresses are located.

15. The computer program product of claim 14, wherein the code when executed cause the processor to:
    identify reference street addresses associated with a geographical region in which the plurality of street addresses are located, each reference street address comprising values for components of street address data, wherein each value for a component of street address data is associated with the canonical representation; and
    assign canonical representations to values of components of street address data for the street addresses based on the values of the reference street addresses.

16. The computer program product of claim 12, wherein the code when executed cause the processor to:
    compare pairs of standardized street addresses to identify matching pairs of standardized street addresses, each matching pair having the same canonical representation

19 for at least one of the components of the street address data for the matching pair; and identify the group of standardized street addresses as containing the matching pairs.

17. The computer program product of claim 12, wherein the code when executed cause the processor to:

selecting a geospatial identifier for the representative street address from geospatial identifiers received from providers associated with the street address in the group based on provider type.

18. The computer program product of claim 12, wherein the code when executed cause the processor to:

include in the most comprehensive street address a first value for a first street address component from a first street address in the group; and include in the most comprehensive street address a second value for a second street address component from a second street address in the group.

19. A computer system for creating representations of overlapping street addresses provided by a plurality of providers, the system comprising:

at least one server computer comprising a computer processor, the computer processor configured to execute instructions stored on a computer-readable storage medium, the instructions when executed by the computer processor cause the processor to:

determine a set of components of street address data that collectively represent a complete street address, each component of street address data associated with a type of street address data;

access a plurality of street addresses for a map feature, each of the street addresses comprising values for a plurality of components of street address data from the set and the plurality of street addresses provided by a plurality of providers, each provider assigned a level of trust based on a provider type that is selected for the provider from a plurality of defined provider types;

standardize the plurality of street addresses so that each value for a component of street address data is represented using a canonical representation;

use the canonical representations to identify a group of standardized street addresses for the map feature, wherein each standardized street address in the group has at least one value for a component matching a value for a corresponding component of a same type of another standardized street address in the group; and for each component from the set having one or more associated values in the group of standardized street addresses, selecting a value for the component from the one or more values based on levels of trust of the plurality of providers that provided the values in the group, the selected value provided from a provider with a highest trust level from the levels of trust of the plurality of providers;

wherein the selected values for the components of the set represent a most comprehensive street address for the map feature.

20. The computer system of claim 19, wherein the instructions when executed by the computer processor further cause the processor to:

select a geospatial identifier for the representative street address from geospatial identifiers received from providers associated with the street address in the group based on provider type.

20

21. The computer system of claim 19, the instructions when executed by the computer processor further cause the processor to:

compare pairs of standardized street addresses to identify matching pairs of standardized street addresses, each matching pair having the same canonical representation for the components of the street address data for the matching pair; and identify the group of standardized street addresses based on the matching pairs.

22. The computer system of claim 19, the instructions when executed by the computer processor further cause the processor to:

identify reference street addresses associated with a geographical region in which the plurality of street addresses are located, each reference street address comprising values for components of street address data, wherein each values for a component of street address data is associated with the canonical representation; and assign canonical representations to values of components of street address data for the plurality of street addresses received from the plurality of providers based on the values of the reference street addresses.

23. A computing device comprising at least one hardware element configured to implement a feature selection module, the feature selection module causing the computer device to:

determine a set of components of street address data that collectively represent a complete street address, each component of street address data associated with a type of street address data;

access a plurality of different street addresses for a map feature and a plurality of geospatial identifiers for the map feature that are provided by multiple sources a plurality of providers each assigned a level of trust based on a provider type that is selected for each of the plurality of providers from a plurality of defined provider types, each of the plurality of street addresses comprising values for a plurality of components of street address data from the set;

for each component from the set having one or more associated values in the plurality of different street addresses, selecting a value for the component from the one or more values based on levels of trust of the plurality of providers that provided the values, the selected value provided from a provider with a highest trust level from the levels of trust of the plurality of providers, wherein the selected values for the components of the set represent a most comprehensive street address for the map feature; and select a geospatial identifier provided by one of the multiple sources plurality of providers to associate with the most comprehensive street address for the map feature, the geospatial identifier selected by comparing the trust levels of the multiple sources plurality of providers and selecting the geospatial identifier provided by a provider with a highest trust level from the levels of trust of the plurality of providers a most trusted source.

24. The computing device of claim 23, wherein the at least one hardware element comprises a computer processor configured to implement the feature selection module according to executable instructions stored in a computer-readable medium.

25. The computer device of claim 23, where in the feature selection module further causes the computing device to:

identify the plurality of different street addresses for the map feature by determining that the plurality of different street addresses are within a threshold distance of one another.

* * * * *